United States Patent

Nagao et al.

[11] Patent Number: 5,869,956
[45] Date of Patent: Feb. 9, 1999

[54] SOLAR POWER GENERATION APPARATUS AND POWER CONTROL DEVICE THEREFOR

[75] Inventors: Yoshitaka Nagao, Ikoma; Kimitoshi Fukae, Nara; Nobuyoshi Takehara, Soraku-gun; Seiji Kurokami, Kyotanabe, all of Japan

[73] Assignee: Canon Kabushiki Kaisha, Tokyo, Japan

[21] Appl. No.: 922,550

[22] Filed: Sep. 3, 1997

[30] Foreign Application Priority Data

Sep. 6, 1996 [JP] Japan .................................. 8-236568

[51] Int. Cl.$^6$ ........................................................ G05F 5/00
[52] U.S. Cl. ............................................. 323/299; 363/79
[58] Field of Search ...................................... 323/299, 303, 323/906; 363/78, 79

[56] References Cited

U.S. PATENT DOCUMENTS

| | | | |
|---|---|---|---|
| 4,649,334 | 3/1987 | Nakajima | 323/299 |
| 4,868,379 | 9/1989 | West | 250/203 R |
| 5,654,883 | 8/1997 | Takehara et al. | 363/79 |
| 5,682,305 | 10/1997 | Kurokami et al. | 323/299 |

FOREIGN PATENT DOCUMENTS

| | | |
|---|---|---|
| 63-57807 | 11/1981 | Japan . |
| 62-085312 | 4/1987 | Japan . |
| 7-22565 | 1/1995 | Japan . |
| 7-225624 | 8/1995 | Japan . |

*Primary Examiner*—Matthew Nguyen
*Attorney, Agent, or Firm*—Fitzpatrick, Cella, Harper & Scinto

[57] ABSTRACT

In order to extract maximum power from a solar cell, maximum power point tracking (MPPT) control is performed under ordinary circumstances. If the output current of the solar cell becomes too small, the operating point of the solar cell is caused to fluctuate over a range wider than that of MPPT control at a period longer than that of MPPT control and the output voltage and current of the solar cell is sampled. In a case where it is indicated by power values obtained from the sample voltage values and current values that a plurality of maximal points of power value exist, a voltage value corresponding to a power value indicative of the largest value is set as the operating point of the solar cell.

16 Claims, 11 Drawing Sheets

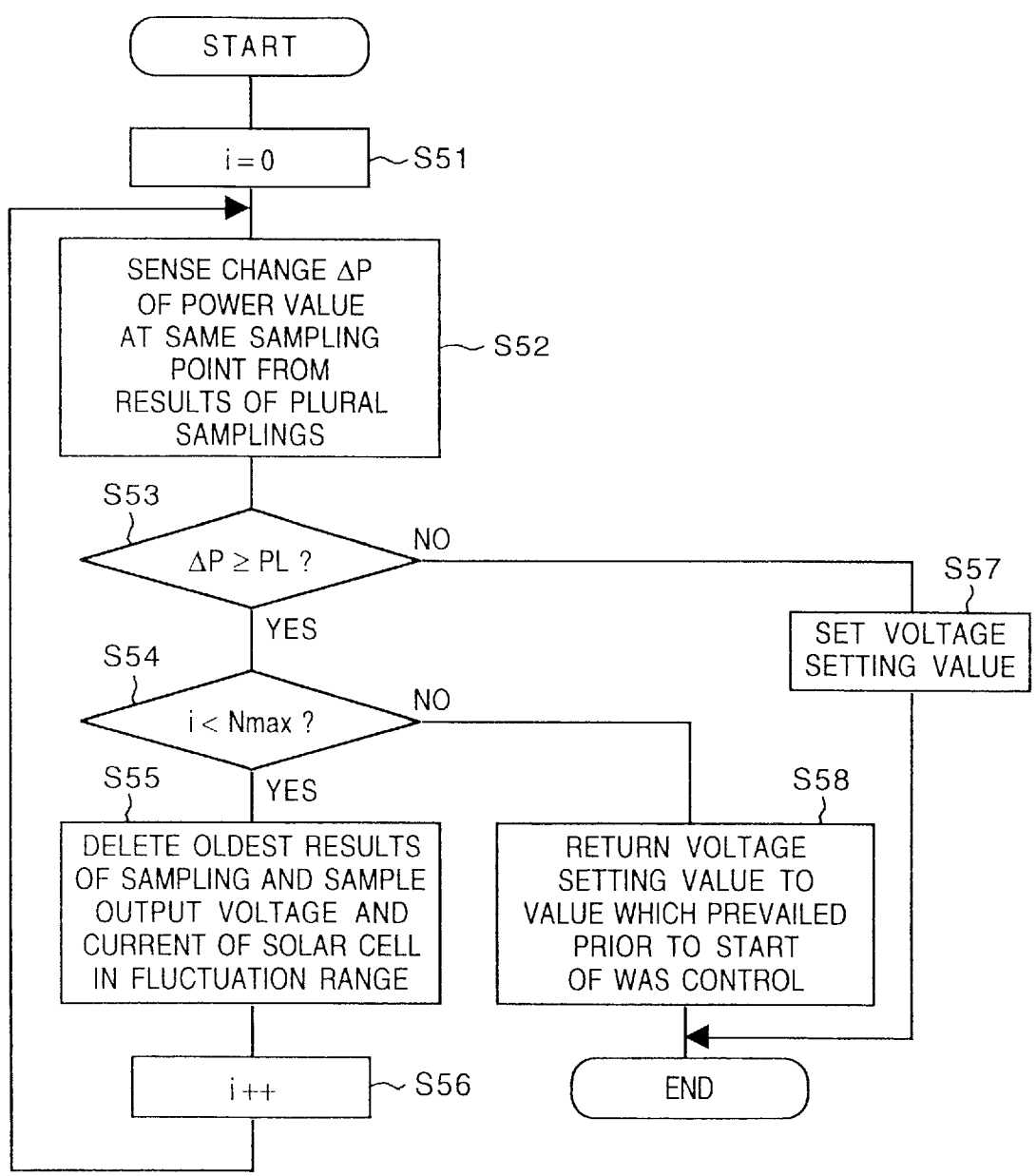

SOLAR POWER GENERATION APPARATUS AND POWER CONTROL DEVICE THEREFOR

BACKGROUND OF THE INVENTION

1. Field of the Invention

This invention relates to a solar power generation apparatus and a power control device therefor.

2. Description of Related Art

Since the output of a solar cell fluctuates significantly depending upon such factors as the amount of solar radiation, temperature and operating-point voltage, it is desired that the load as seen from the solar cell be adjusted so as to extract the maximum power at all times. To accomplish this, maximum power point tracking control (hereinafter "MPPT control") has been proposed. To realize MPPT control, the operating point of a solar cell array is made to fluctuate by varying the output voltage and current of the solar cell array, which is constituted by a plurality of solar cells, and the output power characteristic of the solar cell array is examined by checking the output power of each operating point. Then, on the basis of the voltage-power characteristic obtained, operating point at or in the vicinity of maximum power of the solar cell array is tracked.

For example, there is an tracking method, described in the specification of Japanese Patent Publication (KOKOKU) No. 63-57807, which utilizes a voltage differential of power, or the so-called hill-climbing method, described in the specification of Japanese Patent Application Laid-Open (KOKAI) No. 62-85312, of searching for the maximum power point in the direction of an increasing change in amount of power.

Further, in art described in the specification of Japanese Patent Application Laid-Open (KOKAI) No. 7-225624, maximal points of power are sensed between the open circuit voltage Voc of a solar cell and the minimum voltage at allowed maximum current, and the operating point of the solar cell is set as that maximal point of power, among those which have been sensed, at which maximum power is obtained.

However, in a case where power generated by the solar cell is small and there is little current, there are instances where the output current value of the solar cell cannot be sensed accurately owing to current sensing accuracy related to the resolution of current detection and due to the effects of noise. In such a case, maximal points of power cannot be acquired and the maximum power point cannot be tracked even if MPPT is carried out.

Ordinarily, the voltage-power characteristic of a solar cell array has the shape shown in FIG. 10A (in which voltage V and power P are plotted along the horizontal and vertical axes, respectively). However, when the output current of the solar cell array is low, a plurality of power maximal points are produced, as shown in FIG. 10B, owing to the effects of current detection accuracy mentioned above. Further, power maximal points of the kind shown in FIG. 10C are produced owing to the effects of noise or partial shade. Partial shade refers to a state in which the light-receiving surface of a solar panel becomes partially shaded for some reason.

When the hill-climbing method, in which the direction of the voltage-power characteristic curve at a peak thereof is found based upon an increase or decrease in amount of change in power caused by varying the operating point, is applied to a case where a plurality of maximal points of power are produced, a maximum operating point (1) can be found and the maximum power Pmax can be extracted from the solar cell array in a case where the initial operating point is in the vicinity of the maximal point (1), which is the maximum power point, shown in FIG. 10B. However, if the initial operating point is a maximal point (2) or is in the vicinity of the maximal point (2), the maximal point (2) or a maximal point (3) is mistakenly determined to be the summit of the "peak" of the voltage-power characteristic curve and, hence, the maximum power Pmax cannot be extracted from the solar cell array.

In particular, when the amount of solar radiation increases in the case of FIG. 10B, the voltage-power characteristic varies in the manner shown in FIG. 10E and there is a tendency for the operating voltage corresponding to the maximum power point to rise.

Though the foregoing has been described with regard to problems of MPPT in the hill-climbing method, the same results are obtained even with MPPT utilizing the voltage differential of power.

By contrast, the method described in the specification of the aforementioned Japanese Patent Application Laid-Open No. 7-22565 makes it possible to set the operating point to that maximal point of power, among the plurality thereof, at which the largest power is obtained. However, the range over which a power converter connected to a solar cell array is capable of operating is limited in the manner illustrated in FIG. 10D. Accordingly, in the case shown in FIG. 10D, the maximum power point (1) cannot be recognized as a maximal point and, hence, the maximum power Pmax cannot be extracted from the solar cell array, even if the voltage-power characteristic curve is traced within the range in which operation is possible.

Further, with the method described in the aforementioned Japanese Patent Application Laid-Open No. 7-225624, scanning is performed over a very wide range from the open circuit voltage Voc of the solar cell to the minimum voltage thereof. Consequently, there is concern that a period of time over which the operating point departs from the maximum power point will lengthen during the time that scanning is being carried out, thereby resulting in waste of the power generated by the solar cell. This means that if scanning is performed over a long interval, the maximum power point will fluctuate constantly owing to a change in amount of solar radiation or a change in ambient temperature. As a result, the maximum power point cannot be tracked precisely and maximum power cannot be extracted.

Further, if the amount of solar radiation fluctuates while the aforementioned broad range is being scanned, the operating points of a different voltage-power characteristic will be sampled and an operating point set based upon these samples will not necessarily be the maximum power point.

SUMMARY OF THE INVENTION

Accordingly, an object of the present invention is to provide a solar power generation apparatus and a power control device therefor, wherein maximum power can be extracted from a solar cell in reliable fashion.

According to the present invention, the foregoing object is attained by providing a power control apparatus for supplying a load with power output by a solar cell, comprising: converting means for converting output power of the solar cell to power conforming to the load; sensing means for sensing output voltage and output current of the solar cell; first and second setting means for setting operating voltage of the solar cell based upon the output voltage and output current sensed; and control means for controlling operation of the converting means in such a manner that the output voltage of the solar cell becomes a set operating voltage; wherein the first setting means performs first operating-point setting control for causing the operating voltage to fluctuate over a first fluctuation range at a first period, sampling the output voltage and current of the solar cell and setting the operating voltage on the basis of sampled voltage values and current values in such a manner that output power of the solar cell is maximized; and the second setting means performs second operating-point setting control for causing the operating voltage to fluctuate over a second fluctuation range wider than the first fluctuation range at a second period longer than the first period in a case where the output current of the solar cell is less than a predetermined value, sampling the output voltage and current of the solar cell and setting the operating voltage on the basis of sampled voltage values and current values in such a manner that the output power of the solar cell is maximized.

Further, according to the present invention, the foregoing object is attained by providing a solar power generation apparatus having a solar cell for supplying a load with power generated by the solar cell, comprising: converting means for converting output power of the solar cell to power conforming to the load; sensing means for sensing output voltage and output current of the solar cell; first and second setting means for setting operating voltage of the solar cell based upon the output voltage and output current sensed; and control means for controlling operation of the converting means in such a manner that the output voltage of the solar cell becomes a set operating voltage; wherein the first setting means performs first operating-point setting control for causing the operating voltage to fluctuate over a first fluctuation range at a first period, sampling the output voltage and current of the solar cell and setting the operating voltage on the basis of sampled voltage values and current values in such a manner that output power of the solar cell is maximized; and the second setting means performs second operating-point setting control for causing the operating voltage to fluctuate over a second fluctuation range wider than the first fluctuation range at a second period longer than the first period in a case where the output current of the solar cell is less than a predetermined value, and at a third period longer than the second period in a case where the output current of the solar cell exceeds the predetermined value, sampling the output voltage and current of the solar cell and setting the operating voltage on the basis of sampled voltage values and current values in such a manner that the output power of the solar cell is maximized.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a flowchart illustrating processing for correcting the setting of operating point based upon the results of a plurality of samplings of output power from a solar cell.

DESCRIPTION OF THE PREFERRED EMBODIMENTS

Preferred embodiments of a solar power generation apparatus and power control device therefor according to the present invention will now be described in detail with reference to the drawings.

First Embodiment

Figure 1:
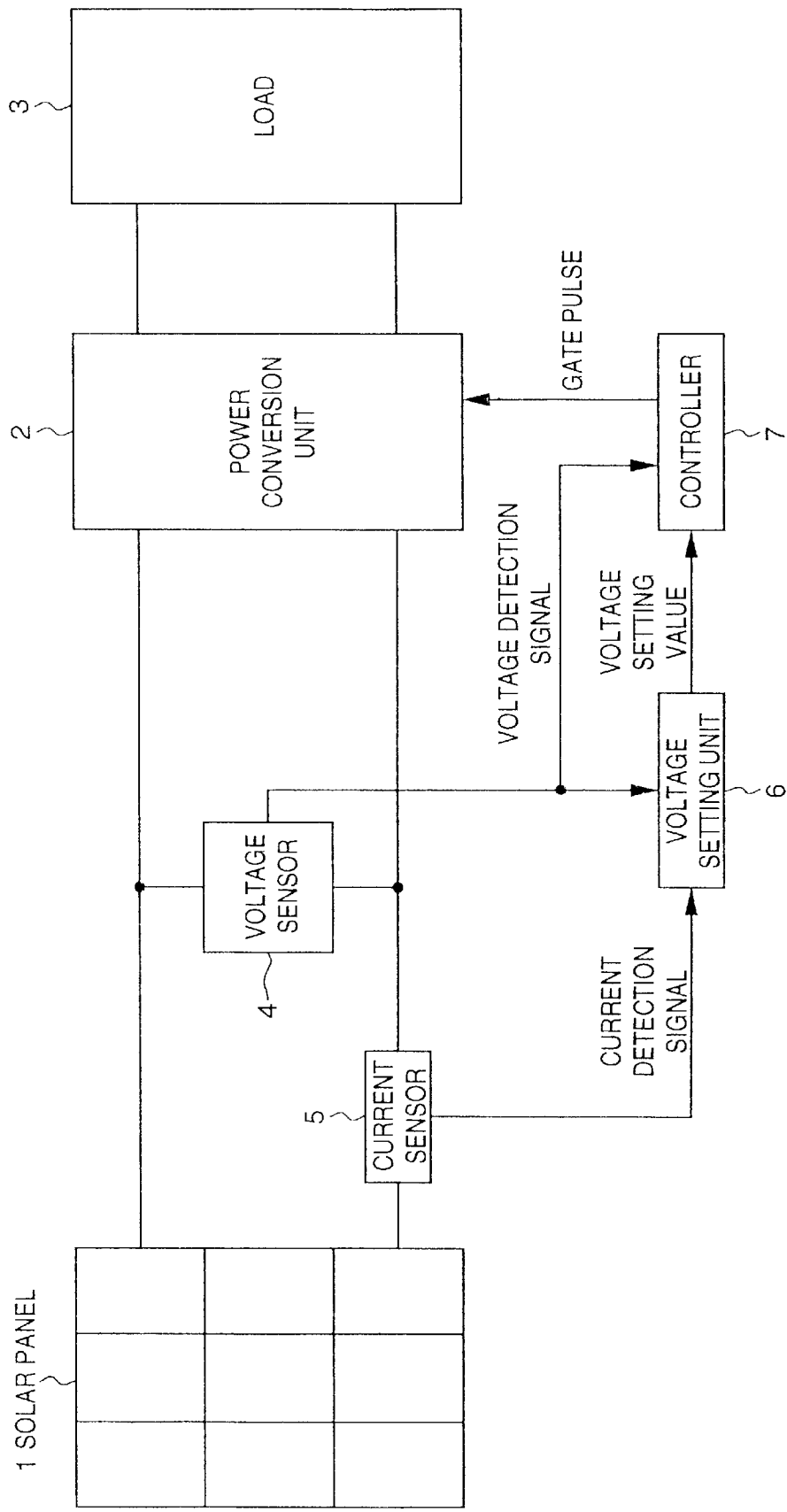
FIG. 1 is a block diagram illustrating the construction of a solar power generation apparatus according to the present invention.

FIG. 1 is a diagram illustrating the construction a solar power generation apparatus which uses a power control device according to this embodiment of present invention.

As shown in FIG. 1, the apparatus includes a solar panel 1 whose output power is converted by a power conversion unit 2 and then supplied to a load 3.

[Solar Panel]

The solar cell is one which employs amorphous silicon, finely crystallized silicon, polycrystalline silicon, single-crystal silicon or a compound semiconductor. Usually the solar panel 1 used is obtained by combining, in a parallel/serial arrangement, a plurality of solar cell modules arrayed so as to obtain the desired voltage and current.

[Power Converting Means]

The power conversion unit 2 may be a DC/DC converter or voltage-type self-oscillated DC/AC inverter using self turn-off type switching devices such as power transistors, power MOSFETs, insulated gate bipolar transistors (IGBTs) or gate turn-off thyristors (GTOs). The power conversion unit 2 is capable of controlling output (power, voltage, frequency, etc.) by changing the on/off duty ratio of the gate pulses supplied to the switching devices.

[Load]

Examples of the load 3 are an electric heater, motor or commercial AC power system or a combination thereof. In a case where the load 3 is a commercial AC power system, power introduced to a system from the solar power generation apparatus tied to the system is not limited. As a result, a greater amount of power can be extracted from the solar panel 1 and this arrangement is a highly desirable one for application of the present invention.

[Control Device]

The output voltage and output current of the solar panel 1 are sensed by a voltage sensor 4 comprising a resistance-type potential divider or the like, and current sensor 5 comprising a shunt resistor or the like. A voltage detection signal representing the sensed output voltage enters a voltage setting unit 6 and a controller 7, and a current detection signal representing the sensed output current enters the voltage setting unit 6.

The voltage setting unit 6 decides the value of a voltage setting, which indicates the operating-point voltage of the solar panel 1, based upon the voltage signal and current signal applied thereto. The voltage setting unit 6 can be implemented by a microcomputer for control and is constituted by a CPU, RAM, ROM, input/output unit, A/D converter, etc.

The controller 7 includes an output control circuit and a gate drive circuit for the power conversion unit 2. The output control circuit comprises a PI control circuit for performing proportional integration (PI) control so as to null a voltage error, which is the difference between the voltage setting value that enters from the voltage setting unit 6 and the voltage signal that enters from the voltage sensor 4, and a PWM circuit which generates a pulse-width modulation (PWM) pulse for gate drive, supplied to the switching devices of the power conversion unit 2, by the triangular wave comparison method or the instantaneous current follow-up control method in dependence upon the output of the PI control circuit. As a result, the on/off duty ratio of the power conversion unit 2 is controlled to control the output voltage of the solar panel 1. It should be noted that the power control circuit can be implemented by a microcomputer for control and is constituted by a CPU, RAM, ROM, input/output unit, A/D converter, etc. Of course, the output control circuit and voltage setting unit 6 can also be implemented by a single microcomputer for control.

[Control Method]

Figure 2:
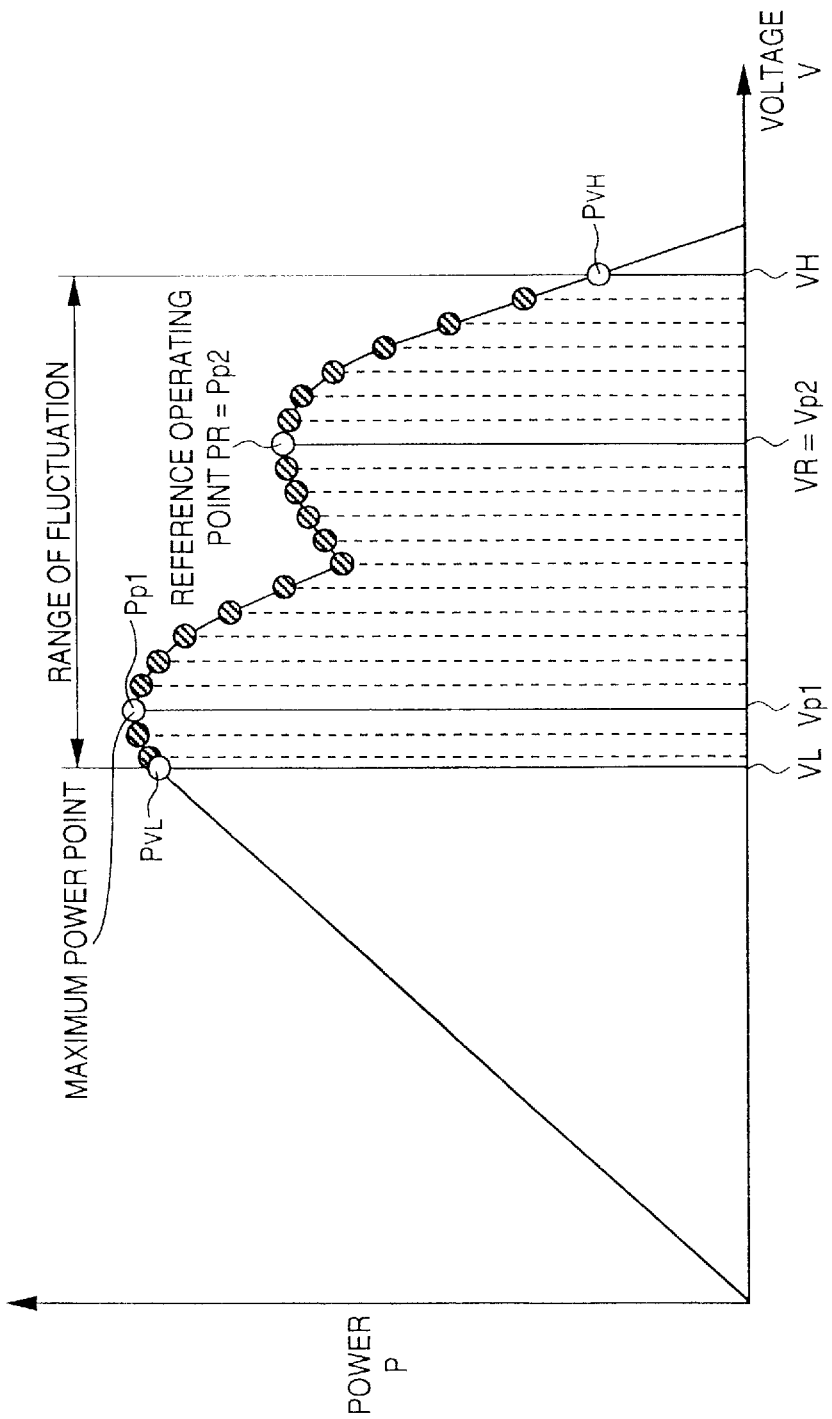
FIG. 2 is a graph useful in describing a method of searching for maximum power point in a power control method according to a first embodiment of the present invention.
Figure 3:
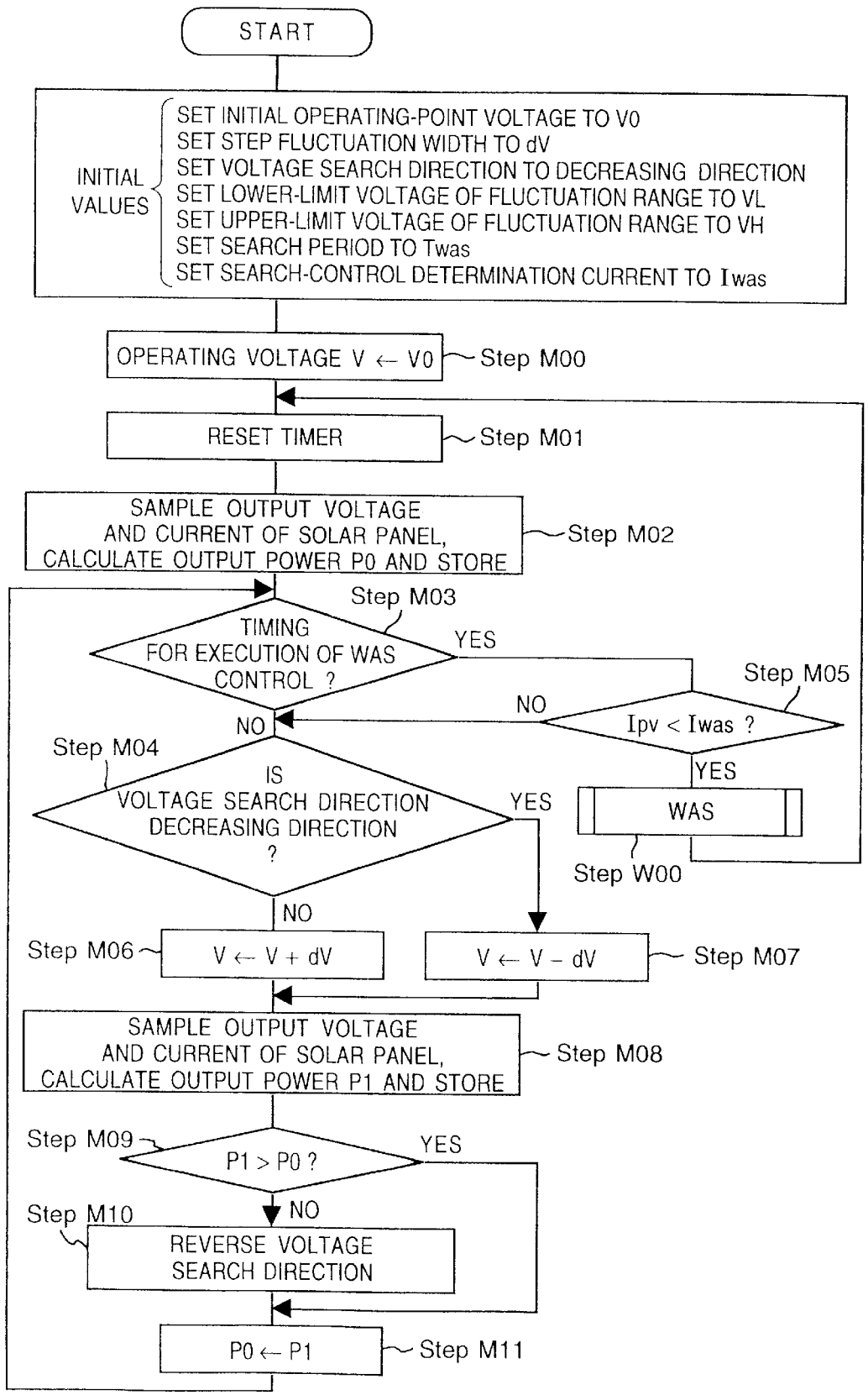
FIG. 3 is a flowchart useful in describing a method of searching for maximum power point in the power control method according to the first embodiment.
Figure 4:
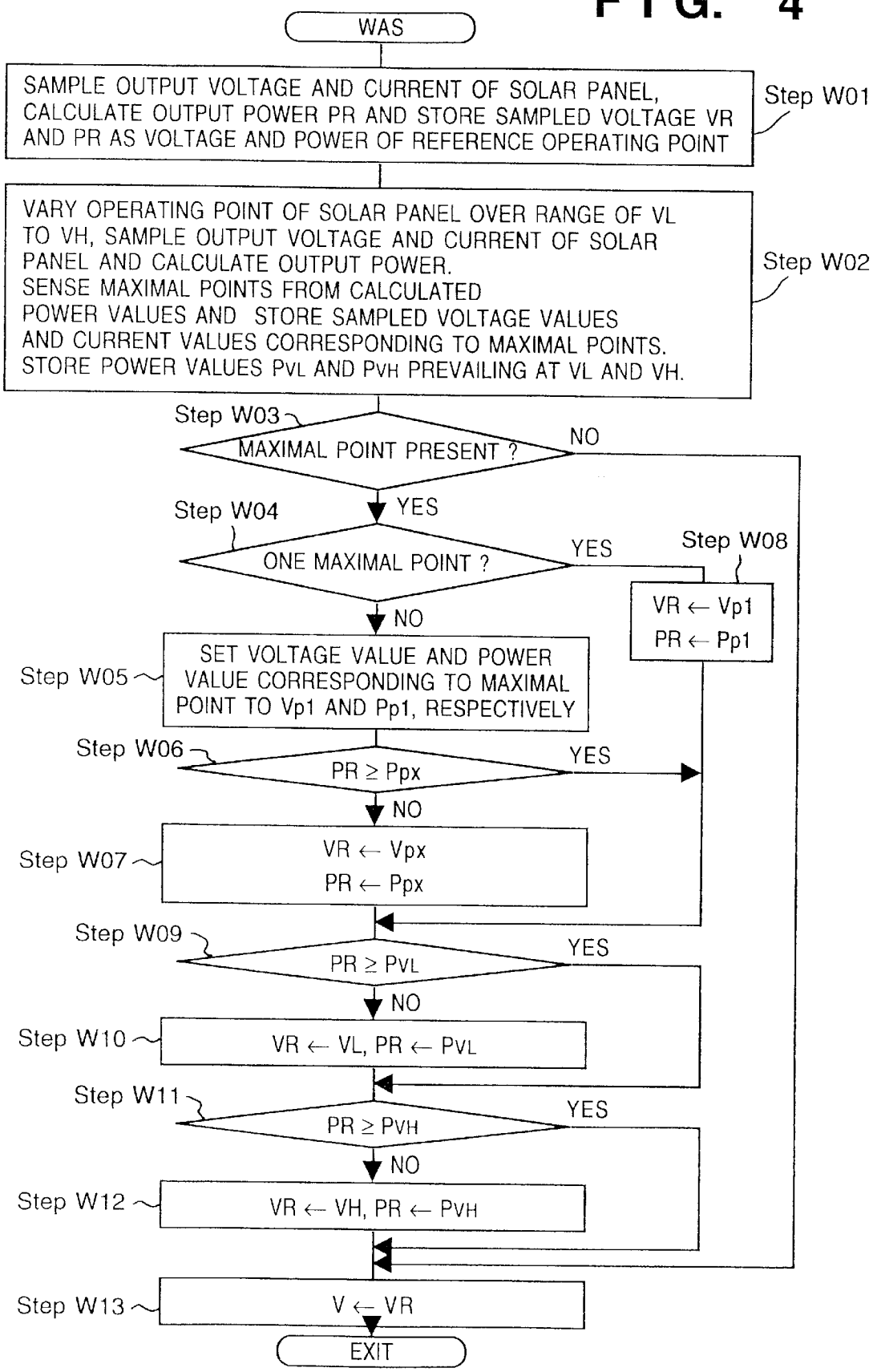
FIG. 4 is a flowchart useful in describing a WAS routine shown in FIG. 3.

A method of searching for maximum power point in the power control device of this invention will now be described with reference to FIGS. 2 and 3. FIG. 2 illustrates the voltage-power characteristic curve of the solar panel 1. Voltage V is plotted along the horizontal axis and power P along the vertical axis. FIGS. 3 and 4 are flowcharts for describing a method of searching for maximum power point executed by the voltage setting unit 6.

In this embodiment, it is assumed that initial operating-point voltage V0, step width dV, search direction, lower-limit voltage VL of fluctuation, upper-limit value VH of fluctuation, search period $T_{WAS}$ and search-control determination current $I_{WAS}$ are predetermined and have been stored in the ROM of the voltage setting unit 6.

The initial operating-point voltage V0 is decided by the configuration of the solar panel 1. Further, dV is made a value which is 1 to 3% of the voltage range over which the power conversion unit 2 is capable of operating. The search direction may be either the direction of increase or decrease. The lower-limit voltage VL of fluctuation range and the upper-limit value VH of fluctuation range are set within the voltage range over which the power conversion unit 2 is capable of operating.

Further, the search is performed at a period longer than that of ordinary MPPT control and over a wider range. This is referred to as a Wide Area Search (WAS). Control for the search of a maximum power point by WAS shall be referred to as WAS control below. The search period $T_{WAS}$ is set to several minutes. In this embodiment, $T_{WAS}$ is set to three minutes.

The search-control discrimination current $I_{WAS}$ is a current for determining whether WAS control is to be carried out or not. If the output current Ipv of the solar panel 1 is less than $I_{WAS}$, then WAS control is executed. Accordingly, a current value readily susceptible to the influence of noise or a current value for which quantization error produced by A/D conversion can no longer be neglected is designated as $I_{WAS}$. The search-control discrimination current $I_{WAS}$ is roughly obtained in accordance with the following equation:

$$I_{WAS} = Vopr \times I1sb / \Delta V$$

where $\Delta V$ represents step width in ordinary MPPT control, Vopr the voltage in a voltage region wherein MPPT can be carried out, the region being decided by the operating voltage range of the power conversion unit 2, and I1sb the current value per bit when the current value is digitized.

After the voltage setting value V is set as the initial operating-point voltage V0 at the start of the power conversion, the voltage setting unit 6 ordinarily performs MPPT control by the aforementioned hill-climbing method and executes WAS control in conformity with the search period $T_{WAS}$. Actual operation is as follows:

(1) When MPPT control is started, first a timer which counts the search period $T_{WAS}$ is reset (step M01). It should be noted that this timer may be realized by software through use of a register within the CPU, or by employing a control microcomputer having an internal timer.

(2) Next, the output voltage and current of the solar panel 1 at the currently set operating point are sampled, the output power value P0 of the solar panel 1 is calculated and this is stored in memory (step M02). Of course, the output power value P0 is obtained as the product of the sampled output voltage and current.

(3) Next, the timer is investigated and it is determined whether the timing at which WAS control is to be executed has arrived (step M03). If the timing at which WAS control is to be executed has not arrived, it is construed that ordinary MPPT control is to be performed at the processing flow proceeds to step M04. If the timing at which WAS control is to be executed has arrived, the sampled output current value Ipv and the search-control determination current $I_{WAS}$ are compared (step M05). If Ipv<$I_{WAS}$ holds, it is construed that WAS control is to be performed and the processing flow proceeds to step W00 so that a WAS subroutine shown in FIG. 4 is executed. If Ipv≧$I_{WAS}$ holds, it is construed that ordinary MPPT control is to be performed and the processing flow proceeds to step M04. Since the search period $T_{WAS}$ is lengthened, as mentioned above, in many cases the processing flow proceeds to step M04.

(4) The flow of processing branches at step M04 depending upon the search direction. If the search direction is the increasing direction, the processing flow proceeds to step M06, where the voltage setting value V is set to a voltage elevated by the step width dV. If the search direction is the decreasing direction, the processing flow proceeds to step M07, where the voltage setting value V is set to a voltage reduced by the step width dV. The flow of processing then proceeds to step M08.

(5) Next, the output voltage and current of the solar panel 1 at the currently set operating point are sampled, the output power value P1 of the solar panel 1 is calculated and this is stored in memory (step M08).

(6) The output power value P1 of the solar panel 1 at the present operating point and the output power value P0 of the solar panel 1 at the preceding operating point are compared (step M09). If P1≦P0 holds, it is decided that the maximum power point has been passed by and the voltage search direction is reversed at step M10. If P1>P0 holds, this means that the maximum power point is still ahead. Step M10 is bypassed, therefore, and the search direction is kept as is.

(7) After the power value P1 that has been stored in memory is updated to the power value P0 (step M11), the processing flow returns to step M03 and the above-described operation is repeated. When it is determined at step M03 that the timing for execution of WAS control has arrived, the current value is discriminated at step M05, as set forth above.

The WAS routine will be described with reference to FIG. 4.

(1) In the WAS routine, first the output voltage and current of the solar panel 1 at the present operating point are sampled, the power value is calculated and the sampled voltage value and calculated power value are stored in memory as a reference operating-point voltage VR and a reference operating-point power PR, respectively (step W01).

(2) Next, the operating point of the solar panel 1 is varied over a range from the lower-limit voltage VL of the fluctuation range to the upper-limit value VH of the fluctuation range, the output voltage and current of the solar panel 1 are sampled and the power values are calculated. Maximal points are sensed from a plurality of calculated power values, and sampled voltage values and power values corresponding to the maximal points are stored in memory. Further, power values $P_{VL}$ and $P_{VH}$ at the operating points VL and VH, respectively, are stored (step W02).

(3) Next, whether a maximal point is present or not is discriminated. In the absence of a maximal point, it is judged that there is no "peak" in the search range from VL to VH and the flow of processing jumps to step W13. If a maximal point is present, the processing flow proceeds to step W04. Here the flow of processing branches depending upon whether the number of maximal points is only one or two or more.

(4) In a case where there is only one maximal point, a voltage value Vp1 and power value Pp1 corresponding to this maximal point are set as the reference operating-point voltage VR and power PR (step W08) and the flow of processing proceeds to step W09.

(5) In a case where there are two or more maximal points, the power values corresponding to these maximal points are set as Ppx (x=1, 2, . . . , number of maximal points), the voltage values corresponding to these maximal points are set as Vpx (step W05), and Ppx and the reference operating-point power PR set at step W01 are compared (step W06). When PR<Ppx holds, a maximal point x corresponding to Ppx is set to become the reference operating point (step W07) and the flow of processing proceeds to step W09.

(6) The reference operating-point voltage PR and power $P_{VL}$ at the lower-limit voltage VL of the search range set at step W02 are compared at step W09. When PR<$P_{VL}$ holds, VL and $P_{VL}$ are set as the reference operating-point voltage VR and power PR, respectively (step W10), and the flow of processing proceeds to step W11.

(7) The reference operating-point voltage PR and power $P_{VH}$ at the upper-limit voltage VH of the search range set at step W02 are compared at step W11. When PR<$P_{VH}$ holds, VH and $P_{VH}$ are set as the reference operating-point voltage VR and power PR, respectively (step W12), and the flow of processing proceeds to step W13.

(8) The reference operating-point voltage VR is set as the voltage setting value V at step W13 and the WAS routine is ended.

(9) Following the completion of WAS control at step W00, the program returns to step M01 in FIG. 3, the timer which counts the search period $T_{WAS}$ is reset and the above-described operation is repeated.

Thus the power control device according to this embodiment ordinarily tracks the maximum power point of the solar panel 1 accurately by MPPT control. The power control device then performs WAS control, in which maximal points of output power of the solar panel 1 are sought over a broad voltage range (from VL to VH), which conforms to the operable voltage range of the power conversion unit 2, at the search period $T_{WAS}$ that has been set, and the operating point of the solar panel 1 is set in dependence upon the number of maximal points that have been found. Since the operating points of the solar panel 1 are set as the maximal points found and as the upper and lower limits (VH and VL) of the search range, maximum power is extracted reliably from the solar panel 1 in the voltage range in which the power conversion unit 2 is capable of operating.

In the case of this embodiment in which $\Delta V$=2.5 V, Vopr=150 to 180 V and I1sb=0.034 V hold, $I_{WAS}$ becomes 2.45 A. $I_{WAS}$ was set to 2.5 A upon taking margin into consideration and WAS control was carried out at an $I_{WAS}$ below 2.5 A.

A microcomputer M37710 (manufactured by Mitsubishi Electric Co.) was used as the control microcomputer, which incorporated a 10-bit A/D converter and a 16-bit CPU (inclusive of a 16-bit arithmetic and logic unit). Though 20 bits are necessary to handle the power values of this embodiment and it is necessary to perform a two-word operation in order for processing to be executed by this CPU, this would subject the CPU to a heavy load. Accordingly, the 20-bit power value is calculated by rounding to 16 bits, thereby making high-speed processing possible.

In the case of this embodiment, the number of cycles in which power is calculated from the output voltage value and output current value at one operating point of the solar panel 1 and the power value is compared with that of the preceding operating point was 60 clock cycles. In comparison with the 85 cycles needed in the case where 20 bits are processed as is, this represents a speed-up of about 30%.

To achieve this speed-up, making the data length of the output value conform to the width of the arithmetic and logic unit (the data length capable of being processed) is effective regardless of the CPU. For example, if the CPU is an 8086, the power value should be made 16 bits. In case of a 32-bit CPU such as the 68040, the power value should be made 32 bits. In particular, in the case of a solar power generation apparatus, the maximum power handled by the power control device is substantially fixed. However, since the voltage and power differ depending upon the number of serial and parallel connections of the solar cell modules connected to the apparatus, the voltage and current ranges required to be handled by the power control device widen. In such case it is necessary to raise the resolution of the A/D converter, which is for measuring the output voltage value and current value, in dependence upon the range. Accordingly, calculating the power value, then making the digital value agree with the data length of the arithmetic and logic unit and subsequently executing processing is effective in raising the speed of processing.

It should be noted that ordinary MPPT control performed at all times is not limited to the above-described hill-climbing method and another method may be employed.

Second Embodiment

The solar power generation apparatus using the power control method of this embodiment has the construction shown in FIG. 1, which is the same as the first embodiment. The differences between this power control method and the method of the first embodiment will be described with reference to FIGS. 5, 6 and 7.

Figure 5:
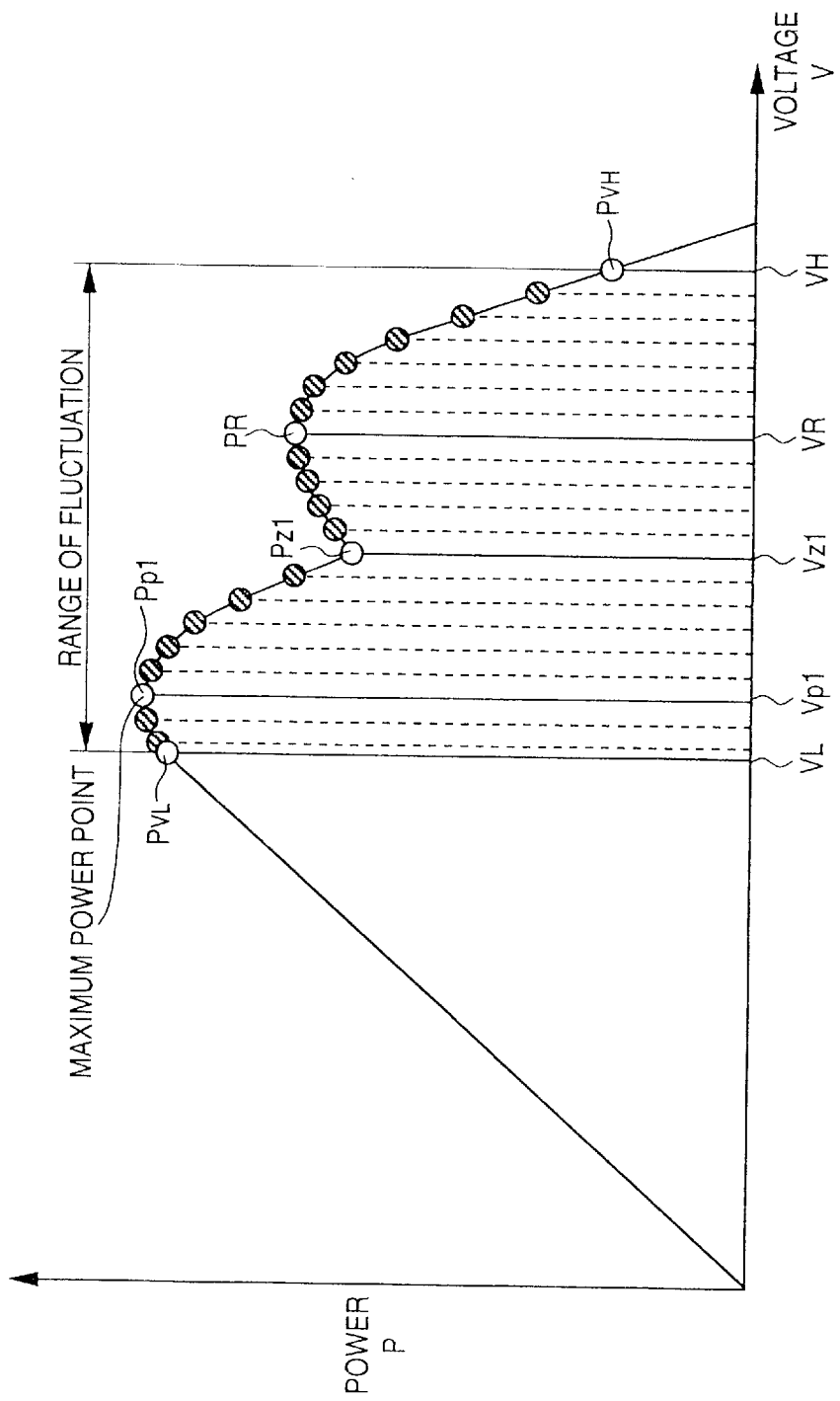
FIG. 5 is a graph useful in describing a method of searching for maximum power point in a power control method according to a second embodiment of the present invention.
Figure 6:
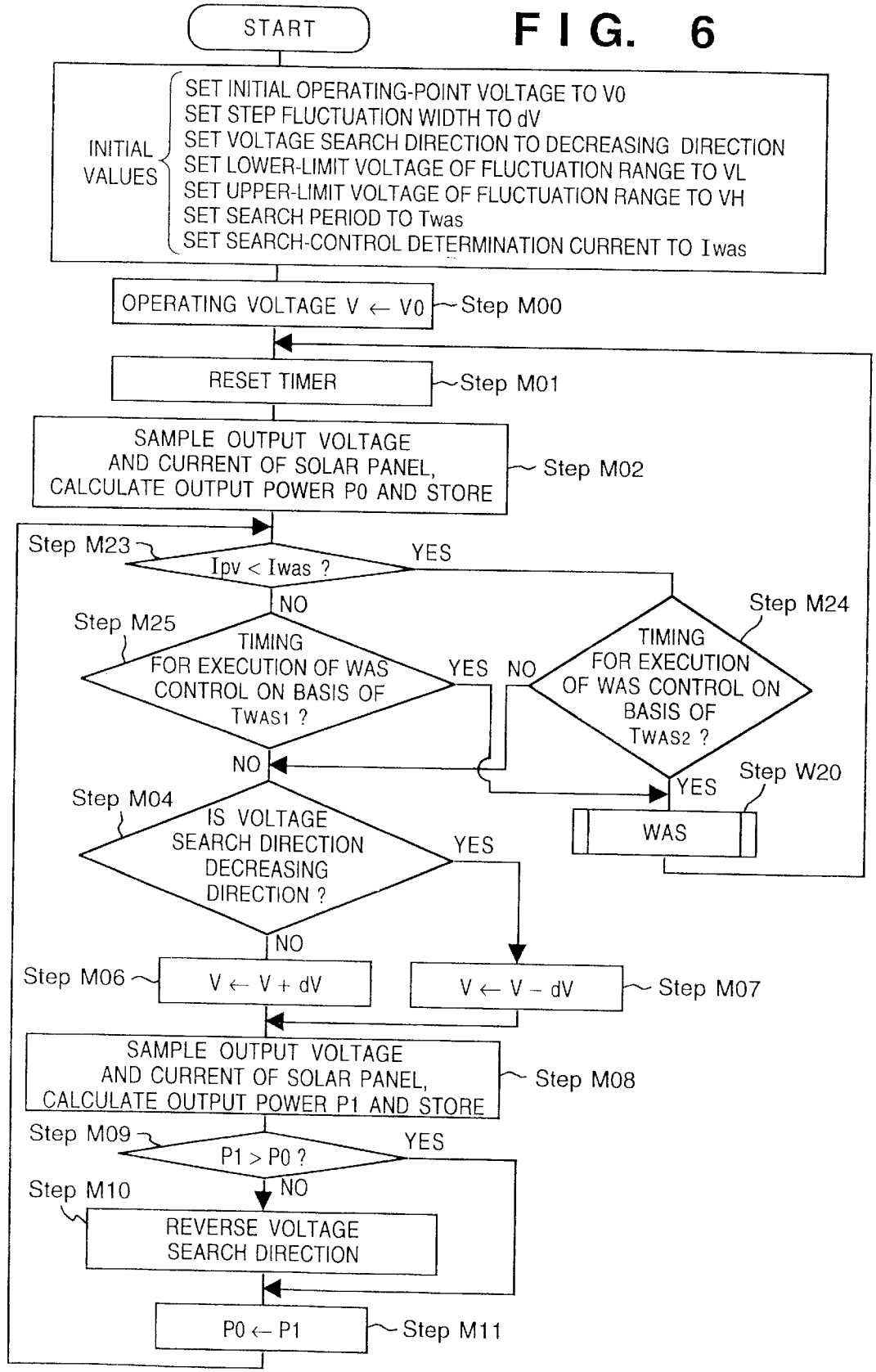
FIG. 6 is a flowchart useful in describing a method of searching for maximum power point in the power control method according to the second embodiment.
Figure 7:
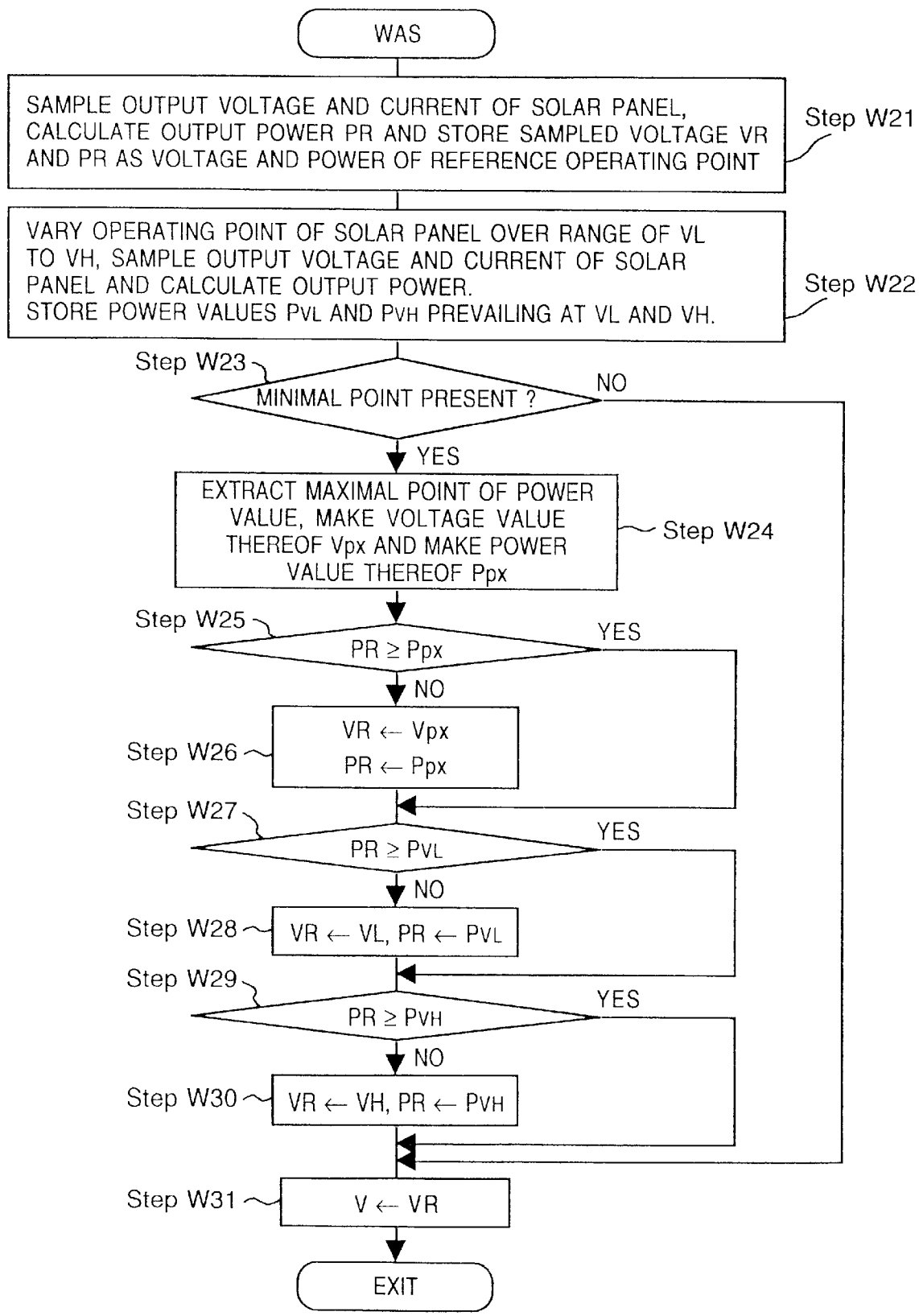
FIG. 7 is a flowchart useful in describing a WAS routine shown in FIG. 6.

FIG. 5 illustrates the voltage-power characteristic curve, in which voltage is plotted along the horizontal axis and power along the vertical axis. FIGS. 6 and 7 are flowcharts according to this embodiment.

The MPPT control constantly carried out from steps M00 to M11, which are the same as the identically labeled steps in FIG. 3, is the hill-climbing method similar to that described in the first embodiment. However, in the control method shown in FIG. 6, the timing at which WAS control is performed is changed. That is, the output current value Ipv of the solar panel 1 and the search-control determination current $I_{WAS}$ are compared at step M23. If Ipv$\geq I_{WAS}$ holds, it is determined whether the timing at which WAS control is executed based upon a first search period $T_{WAS1}$ has arrived (step M25). Here the first search period $T_{WAS1}$ is made several dozen minutes in order to track the maximum power point in a case where the solar panel 1 has a voltage-power characteristic that possess a plurality of maximal points owing to the above-described partial shading.

Further, if Ipv<$I_{WAS}$ holds, it is determined whether the timing at which WAS control is executed based upon a second search period $T_{WAS2}$ has arrived (step M24). Here the second search period $T_{WAS2}$ is made several minutes taking into account the effects of noise at the time of low current or the effects of quantization error. In a case where it is determined that the timing at which WAS control is executed has arrived at step M24 or M25, WAS control is executed at step W20; otherwise, the flow of processing proceeds to step M04.

WAS control (step W20) different from that of the first embodiment will now be described.

According to the WAS routine of the second embodiment, first the output voltage and current of the solar panel 1 at the present operating point are sampled, the power value is calculated and the sampled voltage value and calculated power value are stored in memory as the reference operating-point voltage VR and reference operating-point power PR (step W21).

Next, as shown in FIG. 5, the operating point of the solar panel 1 is varied over a range from the lower-limit voltage VL of fluctuation to the upper-limit value VH of fluctuation, the output voltage and current of the solar panel 1 are sampled and the power values are calculated. Power values $P_{VL}$, $P_{VH}$ at the lower-limit voltage VL and upper-limit value VH of range of fluctuation, respectively, are stored in memory (step W22). If a minimal point Pz1 of power value is sensed at a decision step W23, then the operating point at a maximal point neighboring the minimal point Pz1 is sensed, the voltage value at this operating point is made Vpx (x=1, 2, . . . , number of maximal points), the power value is made Ppx and these are stored in memory (step W24).

If there is a minimal point Pz1, this means that two or more "peaks" exist in the range of fluctuation and there is a possibility that the maximum power point resides at a "peak" other than the "peak" where the present operating point is located. Accordingly, the power values at the operating points of the maximal points and of search limits (VH and VL) are scrutinized.

First, the power value Ppx at a maximal point and the power value PR at the reference operating point PR are compared (step W25). If PR<Ppx holds, the maximal point x corresponding to Ppx is set to become the reference operating point (step W26) and the processing flow proceeds to the next step W27.

The power value PR at the reference operating point and the power $P_{VL}$ at the lower-limit voltage VL of the range of fluctuation stored at step W22 are compared at step W27. When PR<$P_{VL}$ holds, VL and $P_{VL}$ are set as the reference operating-point voltage VR and power PR, respectively (step W28) and the processing flow proceeds to step W29.

The power value PR at the reference operating point and the power $P_{VH}$ at the upper-limit voltage VH of the range of fluctuation stored at step W22 are compared at step W29. When PR<$P_{VH}$ holds, VH and $P_{VH}$ are set as the reference operating-point voltage VR and power PR, respectively (step W30) and the processing flow proceeds to step W31.

If the minimal point Pz1 does not exist, this means that only one "peak" exists in the range of fluctuation. Accordingly, maximum power can be extracted by ordinary MPPT control and the processing flow jumps from step W23 to step W31. The reference operating-point voltage VR is set as the voltage setting value V at step W31 and the WAS routine is ended.

After WAS control is carried out at step W20, the program returns to step M01, the timer which counts the search periods $T_{WAS1}$ and $T_{WAS2}$ is reset and the above-described operation is repeated.

Thus, the power control device according to this embodiment ordinarily tracks the maximum power point of the solar panel 1 accurately by MPPT control. Then, minimal points of output power of the solar panel 1 are sought over a broad voltage range (from VL to VH), which conforms to the operable voltage range of the power conversion unit 2, at the search periods $T_{WAS1}$ and $T_{WAS2}$ that have been set. In a case where there is a minimal point, the operating points at the maximal point neighboring the minimal point and at the upper and lower limits (VH and VL) are scrutinized and the operating point of the solar panel 1 is set as the operating point at which maximum power is obtained. Furthermore, the search period at the time of low current, i.e. when the output current Ipv of the solar panel 1 is less than $I_{WAS}$, is made different from the search period at other times. As a result, the maximum power point can be tracked accurately at all times and maximum power can be extracted from the solar panel 1.

Third Embodiment

The solar power generation apparatus using the power control method of this embodiment has the construction shown in FIG. 1, which is the same as the first and second embodiments. The differences between this power control method and the methods of the first and second embodiments will be described with reference to FIGS. 8 and 9.

Figure 8:
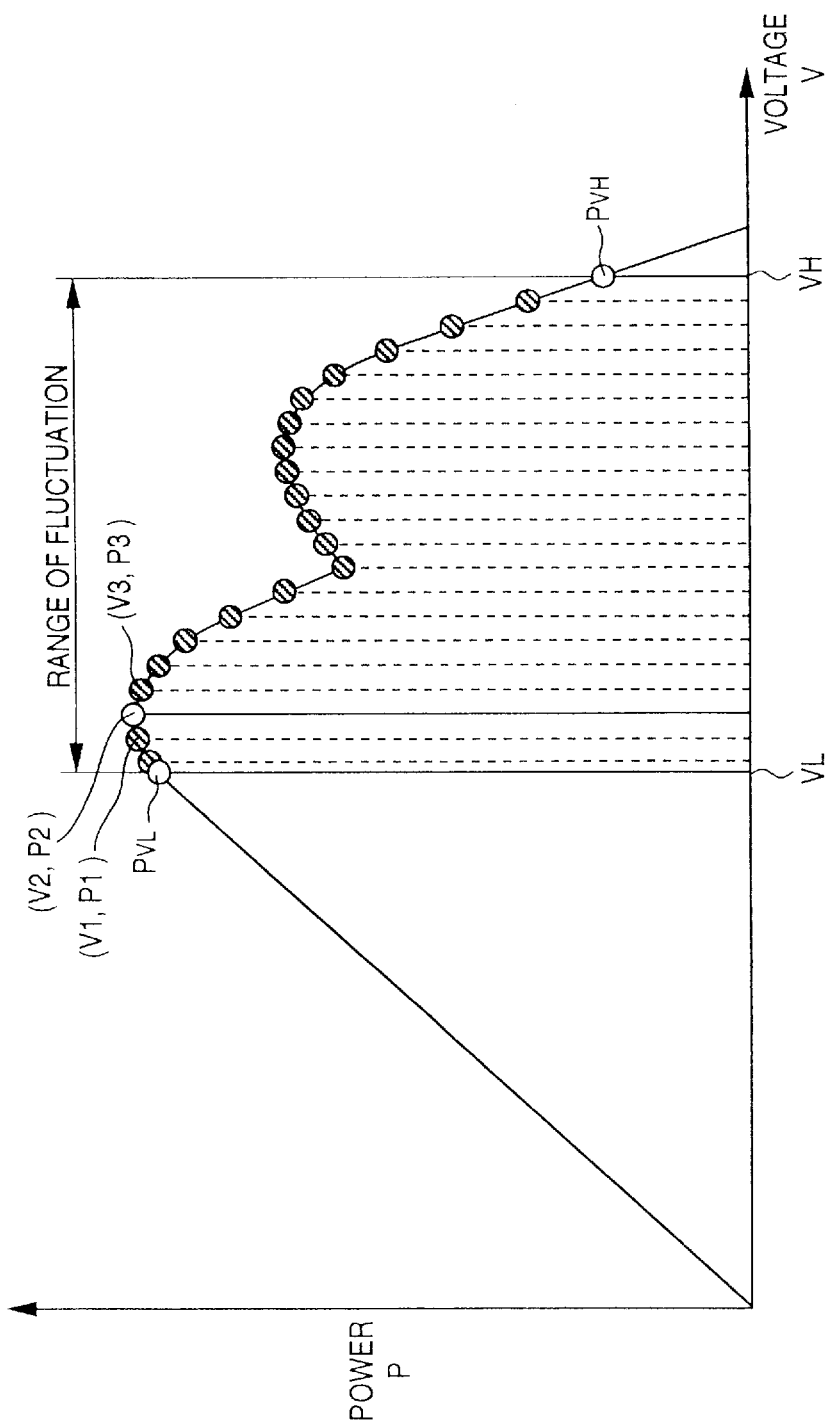
FIG. 8 is a graph useful in describing a method of searching for maximum power point in a power control method according to a third embodiment of the present invention.
Figure 9:
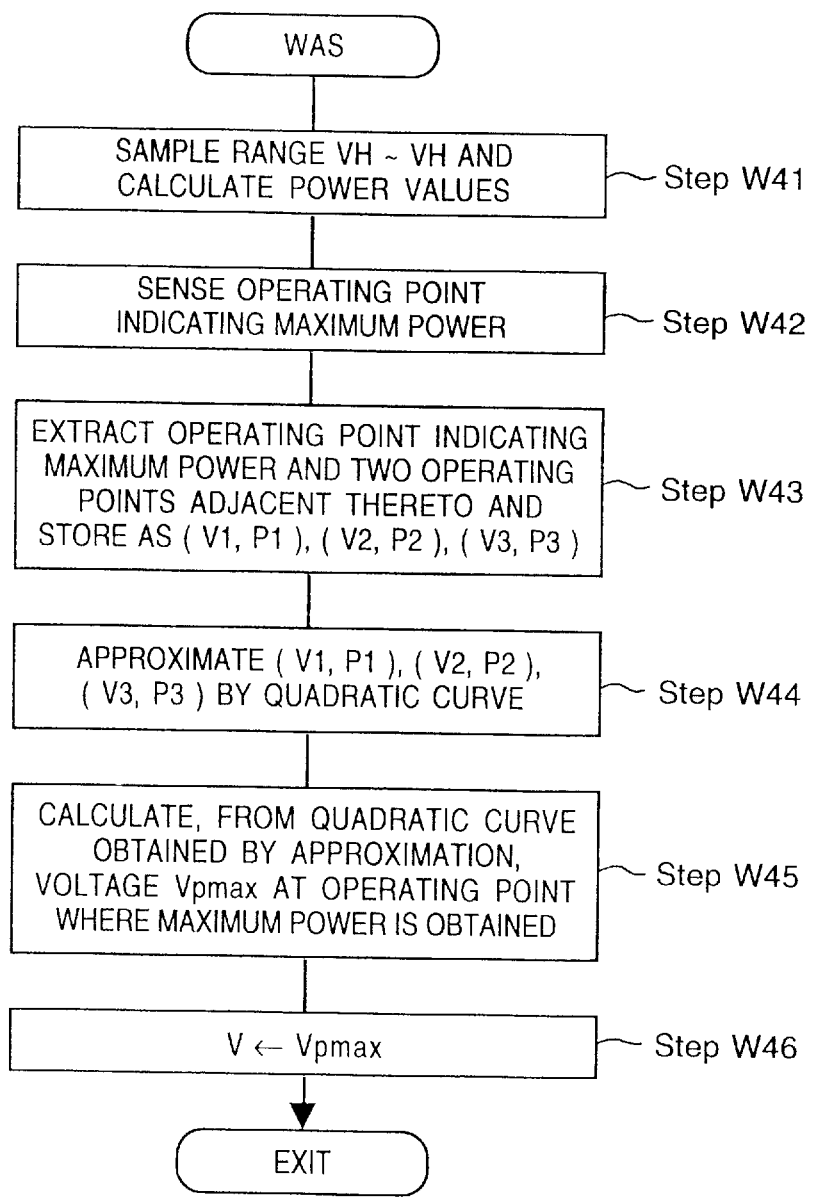
FIG. 9 is a flowchart useful in describing a WAS routine in the power control method of the third embodiment.
Figure 10A:
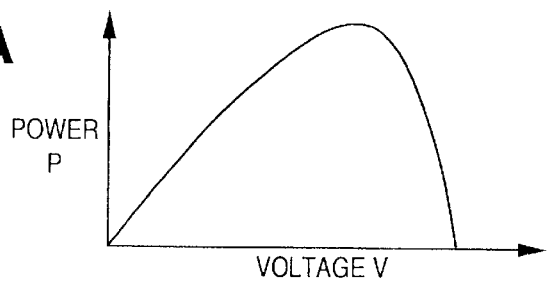
FIGS. 10A through 10E are diagrams for describing examples of voltage-power characteristics of a solar cell.
Figure 10B:
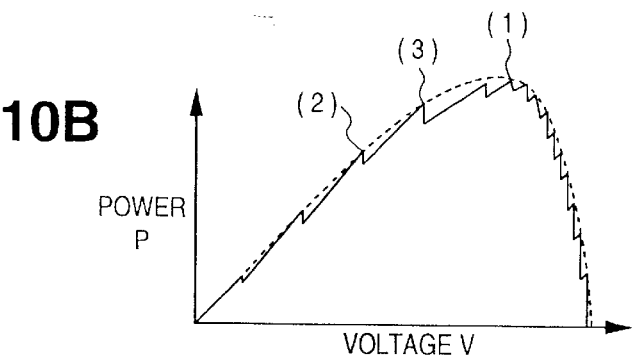
Figure 10C:
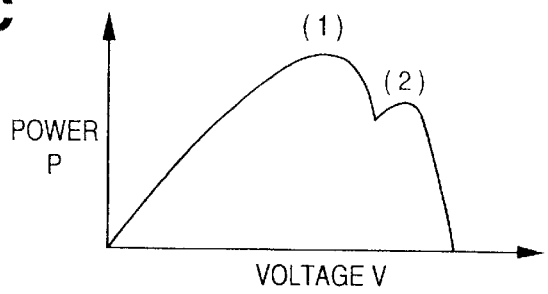
Figure 10D:
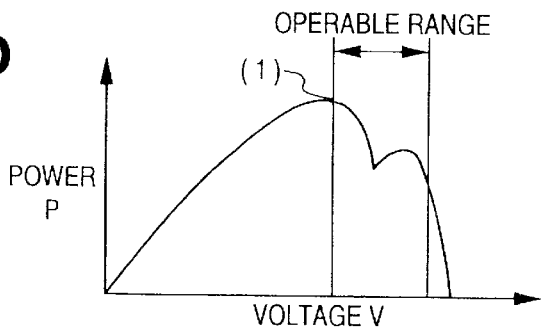
Figure 10E:
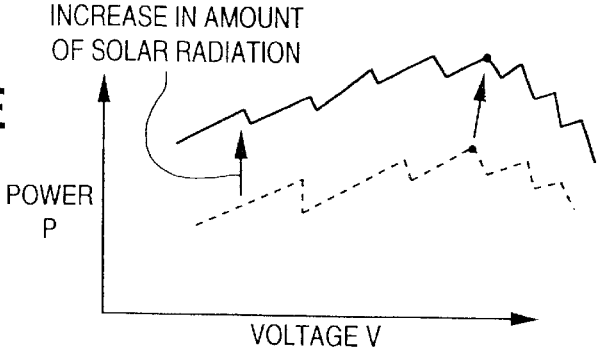

FIG. 8 illustrates the voltage-power characteristic curve, in which voltage is plotted along the horizontal axis and power along the vertical axis. FIG. 9 is a flowchart according to this embodiment. The MPPT control usually performed is the hill-climbing method similar to that of the first or second embodiment. WAS control, which differs from that of the first and second embodiments, will be described below.

According to the WAS routine of the third embodiment, first the operating point of the solar panel 1 is varied over the range from VL to VH shown in FIG. 8, the output voltage and current of the solar panel 1 are sampled and the power values are calculated (step W41).

Next, the operating point indicating the maximum power is sensed among these sensed operating points (step W42), the sensed operating point and operating points adjacent thereto are extracted and these operating points are stored in memory as (V1,P1), (V2,P2) and (V3,P3), respectively (step W43).

The voltage-power characteristic curve is approximated by a quadratic curve based on the three operating points (V1,P1), (V2,P2), (V3,P3) (step W44) and a voltage Vpmax at which the power of the quadratic curve obtained by approximation takes on the maximum value is calculated (step W45).

The voltage Vpmax obtained is set as the voltage setting value V at step W46 and the processing of the WAS routine is ended.

After WAS control is carried out, the processing flow returns to step M01, the timer is reset and the above-described operation is repeated.

Thus, the power control device ordinarily performs MPPT control and tracks the maximum power point of the solar panel 1 accurately. Then, an operating point at which the output power of the solar panel 1 takes on the maximum value is searched for over a broad voltage range (from VL to VH), which conforms to the operable voltage range of the power conversion unit 2, for every search period $T_{WAS}$ that has been set. In the search, the voltage-power characteristic curve of the solar panel 1 is approximated by a function having an extremal based upon the results of sampling the output of the solar panel 1, and an operating point at which the output power of the solar panel 1 will be maximized is set based upon the approximated curve obtained. By virtue of this WAS control, even if the voltage-power characteristic curve has a plurality of "peaks", there will be a shift to the "peak" at which the maximum power is obtained and the maximum power can be extracted from the solar panel 1.

It should be noted that the operating points utilized to find the approximated curve are not limited to three; any number of three or more will suffice. Of course, if the number of operating points utilized to find the approximated curve is increased, a more accurate approximated curve can be obtained but processing will take more time.

The control microcomputer (M37710 manufactured by Mitsubishi Electric Co.) used in this embodiment incorporates a 10-bit A/D converter and a 16-bit CPU (inclusive of a 16-bit arithmetic and logic unit). When the power value is calculated according to this embodiment, 20 bits are required. In order for this data processing to be executed as is, it is required that the 16-bit CPU execute a two-word operation. This subjects the CPU to a heavy load.

In the case of this embodiment, the full scale of the current values is set at 35 A. This means that 19 bits will be necessary to represent power values if half the full scale or 17.5 A is adopted and 18 bits to represent the power values if one-quarter of the full scale or 8.75 A is adopted. Accordingly, if the measured current value is less than 17.5 A, a bit operation which shifts the 20-bit digital value representing the power value three bits to the right is performed. If the measured current value is less than 8.75 A, a bit operation which shifts the 20-bit digital value representing the power value two bits to the right is performed. Thus the digital value representing the power value is handled as 16 bits to improve precision artificially. When measured current value spans two areas, such as the area below 8.5 A and the area from 8.5 A to 17.5 A, the amount of shift of the digital value representing the power value in the area below 8.5 A is made to conform to the amount of shift of the digital value representing the power value in the area from 8.5 A to 17.5 A.

By thus artificially raising precision, the accuracy of MPPT control that performs curve approximation can be improved.

(1) In accordance with each of the foregoing embodiments, the power control device of the present invention performs MPPT control in a short first period and in a narrow first range of fluctuation, whereby the maximum power point of the solar cell is tracked accurately under ordinary conditions.

(2) When the output current of the solar cell is smaller than the search-control determination current $I_{WAS}$, the first embodiment is such that operating points of the solar cell are sampled at a second period $T_{WAS}$ longer in comparison with the first period and in a second fluctuation range wider than the first fluctuation range, and it is determined whether there are a plurality of "peaks" based upon the obtained number of maximal points in the output power of the solar cell. If a plurality of maximal points exist, the operating point is set on the "peak" which indicates maximum power. As a result, maximum power is extracted from the solar cell.

(3) Even if the output current of the solar cell is greater than $I_{WAS}$, the second embodiment is such that operating points of the solar cell are sampled at a third period $T_{WAS1}$ longer in comparison with the second period $T_{WAS}=T_{WAS2}$ and in a third fluctuation range wider than the second fluctuation range. It is determined, even in a case where the voltage-power characteristic has a plurality of maximal points owing to the aforesaid partial shade, whether there is a maximal point of power, and the operating point is set on the "peak" indicating a large power, whereby maximum power is extracted from the solar cell.

(4) In the third embodiment, operating points of the solar cell are sampled at the second period and in the second fluctuation range, a voltage-power curve is obtained by approximating some or all of the obtained operating points by a function having an extremal and the operating point is set as the maximal point of the obtained voltage-power curve, thereby making it possible to extract maximum power from the solar cell.

(5) Furthermore, processing of the kind shown in FIG. 11 can be executed as well. Specifically, a change $\Delta P$ in output value obtained from a voltage value and current value sampled a plurality of times at the same sampling point in the range of fluctuation is calculated (step S52). The change $\Delta P$ and a predetermined value PL are compared (step S53). If $\Delta P \geq PL$ holds, a predetermined number of times Nmax is adopted as an upper limit, the oldest results of sampling are deleted and sampling in the range of fluctuation is performed again (step S55). Further, if the count i of a loop counter initialized at step S51 and incremented at step S56 becomes equal to Nmax, then the voltage setting value is returned to the value which prevailed prior to the start of WAS control (step S58). If $\Delta P<PL$ is found to hold at step S53, then the voltage setting value is set based upon the results of sampling in the manner described above (step S57). If this arrangement is adopted, whether or not there has been a change in amount of solar radiation can be discriminated based upon a change in current value or power value at the same voltage operating point, the setting of an erroneous operating point by MPPT control can be prevented and it is possible to prevent a decline in the output of the solar cell due to the setting of an erroneous operating point.

(6) Furthermore, after a digital power value is calculated from a digital current value and digital voltage value obtained by performing a high-resolution A/D conversion, the digital value representing the power value is subjected to a bit operation so as to match the CPU processing capability (the data length capable of being processed by the arithmetic and logic unit within the CPU). As a result, high-speed arithmetic operation becomes possible and MPPT control capable of following up a change in amount of solar radiation at high speed can be carried out.

As many apparently widely different embodiments of the present invention can be made without departing from the spirit and scope thereof, it is to be understood that the invention is not limited to the specific embodiments thereof except as defined in the appended claims.

What is claimed is:

1. A power control apparatus for supplying a load with power output by a solar cell, comprising:

converting means for converting output power of the solar cell to power conforming to the load;

sensing means for sensing output voltage and output current of the solar cell;

first and second setting means for setting operating voltage of the solar cell based upon the output voltage and output current sensed; and control means for controlling operation of said converting means in such a manner that the output voltage of the solar cell becomes a set operating voltage;

wherein said first setting means performs first operating-point setting control for causing said operating voltage to fluctuate over a first fluctuation range at a first period, sampling the output voltage and current of the solar cell and setting said operating voltage on the basis of sampled voltage values and current values in such a manner that output power of the solar cell is maximized; and said second setting means performs second operating-point setting control for causing said operating voltage to fluctuate over a second fluctuation range wider than the first fluctuation range at a second period longer than the first period in a case where the output current of the solar cell is less than a predetermined value, sampling the output voltage and current of the solar cell and setting said operating voltage on the basis of sampled voltage values and current values in such a manner that the output power of the solar cell is maximized.

2. The apparatus according to claim 1, wherein in a case where it is indicated by power values obtained from voltage values and current values sampled in the second fluctuation range that a plurality of maximal points of power value exist, said second operating-point setting control sets said operating voltage at a maximal point that indicates a larger power value.

3. The apparatus according to claim 1, wherein said second operating-point setting control stores power values obtained from voltage values and current values indicating output voltages and currents of the solar cell at a currently set operating voltage, voltage values and current values sampled in the second fluctuation range, and voltage values and current values indicating output voltages and currents of the solar cell at both extremes of the second fluctuation range, and sets a voltage value, which corresponds to that power value among the stored power values that indicates a maximum, as said operating voltage.

4. The apparatus according to claim 1, wherein said second operating-point setting control calculates power values from voltage values and current values sampled in the second fluctuation range, approximates a voltage-power characteristic as a function having an extremal by data of three more points among points sampled, and sets a voltage value, which corresponds to a maximum power value indicated by an obtained approximation curve of the voltage-power characteristic, as said operating voltage.

5. The apparatus according to claim 1, wherein said second operating-point setting control calculates power values from voltage values and current values sampled a plurality of times in the second fluctuation range, senses a change in power value at the same sampling point, sets said operating voltage if the change sensed is less than a predetermined value, and if the change sensed is equal to or greater than the predetermined value, deletes oldest results of sampling, re-samples output voltage and current of the solar cell in the second fluctuation range and discriminates a change in the power value again.

6. The apparatus according to claim 5, wherein in a case where number of times re-sampling is performed attains a predetermined number, said second operating-point setting control sets an operating voltage that prevailed prior to start of said second operating-point setting control as said operating voltage.

7. A power control apparatus for supplying a load with power output by a solar cell, comprising:

converting means for converting output power of the solar cell to power conforming to the load;

sensing means for sensing output voltage and output current of the solar cell;

first and second setting means for setting operating voltage of the solar cell based upon the output voltage and output current sensed; and control means for controlling operation of said converting means in such a manner that the output voltage of the solar cell becomes a set operating voltage;

wherein said first setting means performs first operating-point setting control for causing said operating voltage to fluctuate over a first fluctuation range at a first period, sampling the output voltage and current of the solar cell and setting said operating voltage on the basis of sampled voltage values and current values in such a manner that output power of the solar cell is maximized; and said second setting means performs second operating-point setting control for causing said operating voltage to fluctuate over a second fluctuation range wider than the first fluctuation range at a second period longer than the first period in a case where the output current of the solar cell is less than a predetermined value, and at a third period longer than the second period in a case where the output current of the solar cell exceeds the predetermined value, sampling the output voltage and current of the solar cell and setting said operating voltage on the basis of sampled voltage values and current values in such a manner that the output power of the solar cell is maximized.

8. The apparatus according to claim 7, wherein in a case where it is indicated by power values obtained from voltage values and current values sampled in the second fluctuation range that a plurality of maximal points of power value exist, said second operating-point setting control sets said operating voltage at a maximal point that indicates a larger power value.

9. The apparatus according to claim 7, wherein said second operating-point setting control stores power values obtained from voltage values and current values indicating output voltages and currents of the solar cell at a currently set operating voltage, voltage values and current values sampled in the second fluctuation range, and voltage values and current values indicating output voltages and currents of the solar cell at both extremes of the second fluctuation range, and sets a voltage value, which corresponds to that power value among the stored power values that indicates a maximum, as said operating voltage.

10. The apparatus according to claim 7, wherein said second operating-point setting control calculates power values from voltage values and current values sampled in the second fluctuation range, approximates a voltage-power characteristic as a function having an extremal by data of three more points among points sampled, and sets a voltage value, which corresponds to a maximum power value indicated by an obtained approximation curve of the voltage-power characteristic, as said operating voltage.

11. The apparatus according to claim 7, wherein said second operating-point setting control calculates power values from voltage values and current values sampled a plurality of times in the second fluctuation range, senses a change in power value at the same sampling point, sets said operating voltage if the change sensed is less than a predetermined value, and if the change sensed is equal to or greater than the predetermined value, deletes oldest results of sampling, re-samples output voltage and current of the solar cell in the second fluctuation range and discriminates a change in the power value again.

12. The apparatus according to claim 11, wherein in a case where number of times re-sampling is performed attains a predetermined number, said second operating-point setting control sets an operating voltage that prevailed prior to start of said second operating-point setting control as said operating voltage.

13. A solar power generation apparatus having a solar cell for supplying a load with power generated by said solar cell, comprising:

converting means for converting output power of the solar cell to power conforming to the load;

sensing means for sensing output voltage and output current of the solar cell;

first and second setting means for setting operating voltage of the solar cell based upon the output voltage and output current sensed; and control means for controlling operation of said converting means in such a manner that the output voltage of the solar cell becomes a set operating voltage;

wherein said first setting means performs first operating-point setting control for causing said operating voltage to fluctuate over a first fluctuation range at a first period, sampling the output voltage and current of the solar cell and setting said operating voltage on the basis of sampled voltage values and current values in such a manner that output power of the solar cell is maximized; and said second setting means performs second operating-point setting control for causing said operating voltage to fluctuate over a second fluctuation range wider than the first fluctuation range at a second period longer than the first period in a case where the output current of the solar cell is less than a predetermined value, sampling the output voltage and current of the solar cell and setting said operating voltage on the basis of sampled voltage values and current values in such a manner that the output power of the solar cell is maximized.

14. A solar power generation apparatus having a solar cell for supplying a load with power generated by said solar cell, comprising:

converting means for converting output power of the solar cell to power conforming to the load;

sensing means for sensing output voltage and output current of the solar cell;

first and second setting means for setting operating voltage of the solar cell based upon the output voltage and output current sensed; and control means for controlling operation of said converting means in such a manner that the output voltage of the solar cell becomes a set operating voltage;

wherein said first setting means performs first operating-point setting control for causing said operating voltage to fluctuate over a first fluctuation range at a first period, sampling the output voltage and current of the solar cell and setting said operating voltage on the basis of sampled voltage values and current values in such a manner that output power of the solar cell is maximized; and said second setting means performs second operating-point setting control for causing said operating voltage to fluctuate over a second fluctuation range wider than the first fluctuation range at a second period longer than the first period in a case where the output current of the solar cell is less than a predetermined value, and at a third period longer than the second period in a case where the output current of the solar cell exceeds the predetermined value, sampling the output voltage and current of the solar cell and setting said operating voltage on the basis of sampled voltage values and current values in such a manner that the output power of the solar cell is maximized.

15. A method of controlling a solar power generation apparatus having converting means for converting output power of a solar cell to power conforming to a load, sensing means for sensing output voltage and output current of the solar cell, setting means for setting operating voltage of the solar cell based upon the output voltage and output current sensed, and control means for controlling operation of the converting means in such a manner that the output voltage of the solar cell becomes a set operating voltage, comprising the steps of:

causing said operating voltage to fluctuate over a first fluctuation range at a first period, sampling the output voltage and current of the solar cell and setting said operating voltage in said setting means on the basis of sampled voltage values and current values in such a manner that output power of the solar cell is maximized; and causing said operating voltage to fluctuate over a second fluctuation range wider than the first fluctuation range at a second period longer than the first period in a case where the output current of the solar cell is less than a predetermined value, sampling the output voltage and current of the solar cell and setting said operating voltage in said setting means on the basis of sampled voltage values and current values in such a manner that the output power of the solar cell is maximized.

16. A method of controlling a solar power generation apparatus having converting means for converting output power of a solar cell to power conforming to a load, sensing means for sensing output voltage and output current of the solar cell, setting means for setting operating voltage of the solar cell based upon the output voltage and output current sensed, and control means for controlling operation of the converting means in such a manner that the output voltage of the solar cell becomes a set operating voltage, comprising the steps of:

causing said operating voltage to fluctuate over a first fluctuation range at a first period, sampling the output voltage and current of the solar cell and setting said operating voltage in said setting means on the basis of sampled voltage values and current values in such a manner that output power of the solar cell is maximized;

causing said operating voltage to fluctuate over a second fluctuation range wider than the first fluctuation range at a second period longer than the first period in a case where the output current of the solar cell is less than a predetermined value, sampling the output voltage and current of the solar cell and setting said operating voltage in said setting means on the basis of sampled voltage values and current values in such a manner that the output power of the solar cell is maximized; and causing said operating voltage to fluctuate over a second fluctuation range wider than the first fluctuation range at a third period longer than the second period in a case where the output current of the solar cell exceeds the predetermined value, sampling the output voltage and current of the solar cell and setting said operating voltage to said setting means on the basis of sampled voltage values and current values in such a manner that the output power of the solar cell is maximized.

* * * * *

UNITED STATES PATENT AND TRADEMARK OFFICE
CERTIFICATE OF CORRECTION

PATENT NO. : 5,869,956

DATED : February 9, 1999

INVENTOR(S) : YOSHITAKA NAGAO ET AL.

It is certified that error appears in the above-identified patent and that said Letters Patent is hereby corrected as shown below:

COLUMN 1

Line 26, "an" should read --a--.

COLUMN 6

Line 39, "at" should read --and--.

COLUMN 9

Line 26, "possess" should read --possesses--.

COLUMN 14

Line 1, "extremal" should read --extremal point--.

UNITED STATES PATENT AND TRADEMARK OFFICE
CERTIFICATE OF CORRECTION

PATENT NO. : 5,869,956

DATED : February 9, 1999

INVENTOR(S) : YOSHITAKA NAGAO ET AL.

It is certified that error appears in the above-identified patent and that said Letters Patent is hereby corrected as shown below:

COLUMN 15

Line 11, "extremal" should read --extremal point--.

Signed and Sealed this

Twenty-first Day of December, 1999

*Attest:*

Q. TODD DICKINSON

*Attesting Officer*     *Acting Commissioner of Patents and Trademarks*